(12) United States Patent
Wardaschka et al.

(10) Patent No.: US 10,339,276 B2
(45) Date of Patent: Jul. 2, 2019

(54) METHOD, APPARATUS AND COMPUTER PROGRAM PRODUCT FOR CONTINUOUSLY PROVIDING A LICENSE TO A NETWORK ELEMENT VIA A REMOTE CONNECTION

(75) Inventors: Andre Wardaschka, Duesseldorf (DE); Andreas Wannenwetsch, Duesseldorf (DE); Daniel Fuhrmann, Köln (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 2616 days.

(21) Appl. No.: 11/459,482

(22) Filed: Jul. 24, 2006

(65) Prior Publication Data
US 2008/0021838 A1    Jan. 24, 2008

(51) Int. Cl.
*G06F 21/10* (2013.01)

(52) U.S. Cl.
CPC .......... *G06F 21/10* (2013.01); *G06F 21/105* (2013.01); *G06F 2221/2137* (2013.01)

(58) Field of Classification Search
None
See application file for complete search history.

(56) References Cited

U.S. PATENT DOCUMENTS

| | | | | |
|---|---|---|---|---|
| 5,375,240 A | * | 12/1994 | Grundy | G06F 21/10 726/28 |
| 6,189,146 B1 | * | 2/2001 | Misra | G06F 21/105 705/59 |
| 6,243,692 B1 | * | 6/2001 | Floyd | G06F 21/121 705/51 |
| 6,272,472 B1 | * | 8/2001 | Danneels | G06Q 30/0253 705/14.51 |
| 7,158,043 B2 | * | 1/2007 | Kirkland | G08B 13/08 340/539.1 |
| 2002/0120578 A1 | | 8/2002 | Sy | |
| 2004/0107168 A1 | * | 6/2004 | Millner | G06Q 20/085 705/59 |
| 2004/0250136 A1 | * | 12/2004 | Albertine Trappeniers | H04L 12/14 726/4 |
| 2005/0144139 A1 | | 6/2005 | Zhuge et al. | |
| 2005/0198319 A1 | * | 9/2005 | Chan | G06F 21/31 709/228 |

(Continued)

OTHER PUBLICATIONS

International Search Report from PCT/IB2007/002045 dated Feb. 4, 2008.

*Primary Examiner* — Jay Huang
(74) *Attorney, Agent, or Firm* — Alston & Bird LLP

(57) ABSTRACT

Methods, apparatuses, and a computer program product allow additional features of a software package to be enabled by downloading and activating a corresponding license. More particularly, the methods, apparatuses and computer program product enable a network element, such as transmission equipment of an operator, to request a corresponding license from a server, such as a device management server of a communications provider, via a remote connection, even after a transition period in which all of the software features corresponding to a software package were provided to the operator. The transmission equipment can transmit a request for the corresponding license(s) to the device management server at a time later than the transition period, so that a remote management deadlock situation does not occur.

30 Claims, 4 Drawing Sheets

(56) References Cited

U.S. PATENT DOCUMENTS

| | | | |
|---|---|---|---|
| 2006/0066568 A1* | 3/2006 | Cheah | G06F 1/3215 345/156 |
| 2006/0167808 A1* | 7/2006 | Greene | G06Q 99/00 705/59 |
| 2008/0021838 A1* | 1/2008 | Wardaschka | G06F 21/10 705/59 |

* cited by examiner

METHOD, APPARATUS AND COMPUTER PROGRAM PRODUCT FOR CONTINUOUSLY PROVIDING A LICENSE TO A NETWORK ELEMENT VIA A REMOTE CONNECTION

TECHNOLOGICAL FIELD

Embodiments of the present invention relate generally to software license management of network elements and more particularly, relate to methods, apparatuses, and a computer program product for continuously allowing additional software features to be enabled by deploying one or more licenses via a remote connection.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Moreover, there is an increasing use of mobile communications and organization devices, such as mobile phones, laptop computers, and personal digital assistants (PDAs) that communicate via various wireless and mobile networking technologies which has prompted a corresponding increase in software applications and/or software packages which enable a communications provider to control transmission and reception of traffic in network elements obtained by a customer, such as an administrator of a company data system or an operator of a telecommunications system. Typically, the administrator or operator desires that the network elements are fully functional so that the administrator or operator can transmit and receive communications data to/from end users of terminals (e.g., mobile phones, laptop computers, personal computers, etc.).

Consider an operator who purchases a network element from the communications provider. The network element typically has a corresponding software package containing an array of transmission related features so that the network element can transmit and receive data. The transmission related features associated with the software package may facilitate various types of transmissions such as a packet-switched network (e.g., IP network) transmission or a circuit-switched network transmission from the network element for example. As will be appreciated by those skilled in the art, the communications provider typically influences the operator's use of a corresponding network element based on the terms of a software license associated with the network element.

To illustrate this point, consider the system 10 of FIG. 1, which includes a public network 12, such as a public Internet Protocol (IP) network like the Internet. In addition to the public network 12, the system 10 includes one or more private networks 24, such as local area networks (LANs). The private networks of an operator(s) (e.g., Operator Private Network 1 and Operator Private Network 2) can include license management servers such as client devices 26 and one or more network elements such as a Base Transceiver Station (BTS) 32. Additionally, as can be seen in FIG. 1, a communications provider (e.g., Provider Private Network) can include a device management (DM) server 28. The BTS 32, which is part of the operator network(s) (e.g., Operator Private Network 1 and Operator Private Network 2) is capable of transmitting and receiving communications data. While the BTS 32 in FIG. 1 is transmission equipment (i.e., a network element) that is capable of transmitting and receiving communications data, it should be understood, that the operator networks may also be capable of supporting any other suitable transmission equipment.

To facilitate communications between the public network 12 and network elements of the operator networks 24, each private network can further include a Gateway (GW) 16 interconnecting the public network and the private network.

In the system 10 of FIG. 1, the communications provider (e.g., Provider Private Network) can deploy licenses to license management servers of the operators (e.g., Operator Private Network 1, Operator Private Network 2), such as client device 26 via DM server 28 based on a corresponding software license associated with a software package required to operate BTS 32. It should be understood that, the communications provider may deploy licenses to the operators via any suitable means (i.e., without using the DM server 28 to transmit the license(s) to the client devices 26 of the operators), including but not limited to, transporting the licenses via ordinary mail on a compact disc (CD), a digital versatile disc (DVD) or the like. As appreciated by those skilled in the art, the terms of the software license may specify that the operator is entitled to use some, but not all, of the transmission related features associated with its network elements. As such, software license management by the communications provider allows delivery of unique software packages with limited functionality. For instance, private network operator 2 (i.e., Operator Private Network 2) may utilize the BTS 32 to transmit communications via a Global System for Mobile Communications (GSM) interface while prohibiting transmission using a Wideband Code Division Multiple Access (CDMA) communication interface for example, unless the operator purchases the additional transmission feature(s) and deploys (for example, downloads or receives via ordinary mail) a corresponding license(s).

As noted above, additional features such as transmission related features provided by the software package may be enabled by the operator by obtaining a corresponding license from the communications provider. For example, the operator may receive a license (via a download, transmission, etc.) from the communications provider. Once the license(s) is received by the operator, the licenses could be stored at a server which manages licenses (i.e., license management server). Subsequently, the operator may download the license to a network element such as BTS 32 and activate the license so that the transmission related feature is enabled.

Oftentimes operators encounter problems downloading a corresponding license from a license management server to a network element. For instance, the very feature(s) that the operator is seeking to enable in the software application may be a prerequisite to the connection with the license management server. The transmission network element (e.g. BTS) of the operator may require a certain type of transmission to the license management server (which may not be enabled in the software application) so that the operator can download a corresponding license to the transmission network element. This required transmission may be the transmission feature that the operator is seeking to enable in the software application by obtaining a corresponding license. For example, the operator may be required to remotely download the corresponding license(s) from the license management server to the network element via a packet-switched network transmission. The transmission feature of the software application which activates packet-switched network transmissions may be the precise feature that the operator wants to enable in the software application of the network element. However, since the software application corresponding to the transmission equipment of the operator may not have the packet-switched network transmission feature enabled, the operator may not be able to download a corresponding license to the network element in order to activate packet-switched network transmissions.

As will be appreciated by those skilled in the art, this situation presents a remote management deadlock, which is often seen in paradox, like the 'chicken or the egg' problem. The remote management deadlock problem is oftentimes seen as the 'chicken and egg' problem because a first event can not happen until a second event happens, and the second event can not happen until the first event happens. The two competing events create a deadlock.

In the scenario above, the operator desires to enable a packet-switched network transmission feature in the software application corresponding to transmission equipment (i.e., first event). However, the license management server can not send the corresponding license to the network element because the operator's network element does not have a packet-switched network transmission feature in the software application enabled and, thus does not have packet-switched network transmission capability to download the corresponding license(s) (i.e., second event) which creates a remote management deadlock problem.

Conventional mechanisms for solving the remote management deadlock problem typically utilize static timeout periods. For instance, features associated with a software application and/or software package are enabled for a certain transition period and are disabled after the transition period, if the corresponding license is not installed (e.g., features associated with the software application are subject to a trial period). Referring to the above example, upon commissioning the license management server(s), the corresponding software application may have all of the features enabled for a predetermined time period (i.e., trial period). As such, if the operator(s) desires to activate a packet-switched network transmission from the transmission equipment, the operator may download a corresponding license from the communications provider. (Alternately, the operator may receive the corresponding license from the communications provider using ordinary mail, or any other suitable means)

If the operator waits until after the predetermined time period (i.e., after the trial period) to download (or transmit) the corresponding license to the network element (via a license management server), the download attempt will fail. For instance, the network element of the operator no longer has the packet-switched network transmission capability to receive a license since the predetermined time period expired. Of course, the practical effect of not obtaining a corresponding license until after the predetermined time period still creates a likelihood that a remote management deadlock situation will occur, which oftentimes results in operator dissatisfaction and frustration since the operator's network equipment may be non-operational. The remote management deadlock problem can also increase consumption of network resources by the operator in order to resolve trouble reports resulting from situations in which operators are unable to enable the features they desire. Further, the remote management deadlock problem creates costly site visits to the operator's transmission equipment (e.g., BTS 32) so that the license can be downloaded locally to the operator's transmission equipment. Additionally, the remote management deadlock problem causes the operator to lose potential monetary gains since the operator's network may not be operational and thus, the operator may not be able to facilitate traffic communications for its customers.

In light of the shortcomings described above, it would be advantageous to develop a mechanism which avoids the remote management deadlock problem, allows the operator to download a corresponding license remotely to the operator's transmission equipment (i.e., network element(s)) after the expiration of a trial period, and enables a communications provider to charge operators separately for each additional feature of the applicable software application that they seek to enable.

BRIEF SUMMARY

Methods, apparatuses, and a computer program product are therefore provided which allow additional features of a software application to be enabled by downloading and activating a corresponding license. More particularly, the methods, apparatuses and computer program product enable a network element, such as transmission equipment of an operator, to download a corresponding license from a database (such as a central database or a central license server) of an operator's private network via a remote connection, even after a transition period in which all of the software features were provided to the operator. Since the transmission equipment can transmit a request for the corresponding license(s) to the central license server at a time later than the transition period, a remote management deadlock situation does not occur, thereby increasing operator satisfaction and allowing the communications provider to separately charge the operator for each additional software feature desired.

In one exemplary embodiment, a method for managing and continuously enabling features of software and/or hardware, at a device is provided. The method includes partially enabling, at a first device, one or more features of software for a predetermined time. The method further includes alternately disabling and enabling the one or more features after the predetermined time expires during the respective disabling and enabling time periods. The method further includes obtaining one or more licenses, at the first device, corresponding to the one or more features, during the predetermined time or during a subsequent enabling time period. The method further includes activating, at the first device, the one or more licenses and fully enabling the one or more features.

In another exemplary embodiment, an apparatus for managing and continuously enabling features of software and/or hardware, at a device is provided. The apparatus includes a processing element configured to partially enable, at a first device, one or more features of software for a predetermined time. The processing element is further configured to alternately disable and enable the one or more features after the predetermined time expires during respective disabling and enabling time periods. The processing element is further configured to obtain one or more licenses, at the first device, corresponding to the one or more features, during the predetermined time or during a subsequent enabling time period. The processing element may be further configured to activate, at the first device, the one or more licenses and fully enable the one or more features.

Other embodiments of the invention may provide an apparatus and computer program product for managing and continuously enabling software features at one or more devices. As a result, a remote deadlock situation can be avoided, thereby leading to increased operator satisfaction and potentially increased revenue for a communications provider can now separately charge the operator for each additional software feature.

BRIEF DESCRIPTION OF THE DRAWINGS

Figure 1:
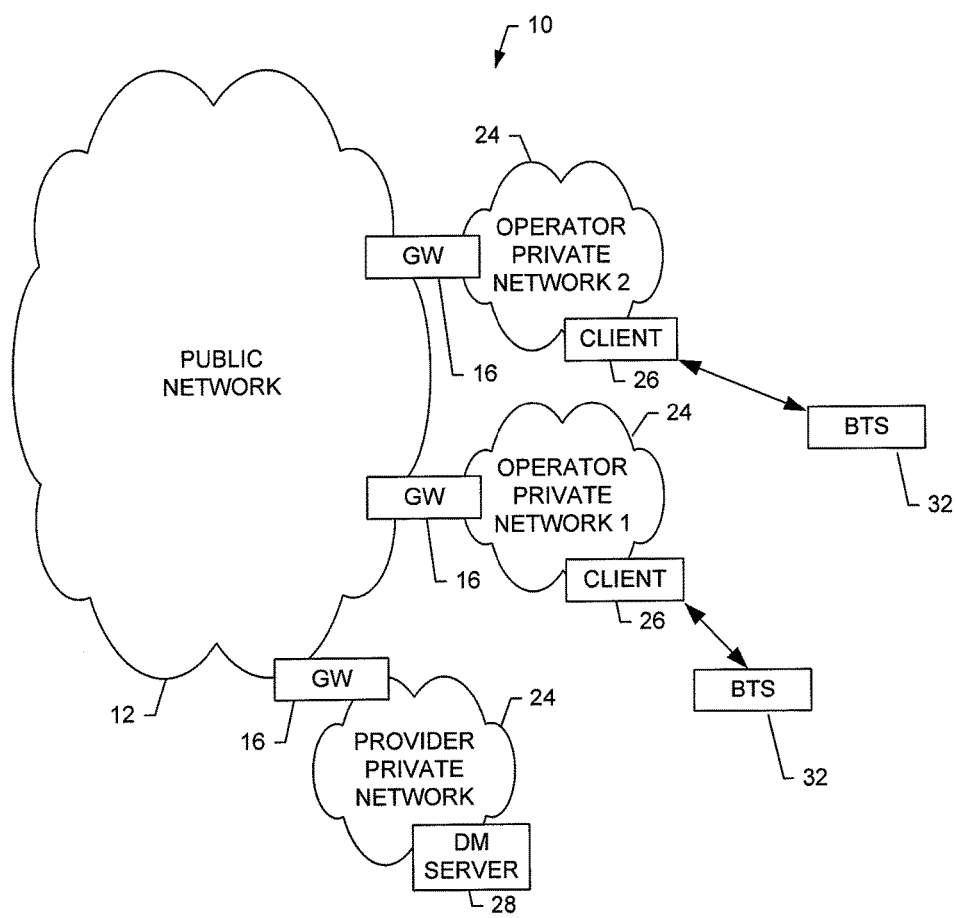
Figure 2:
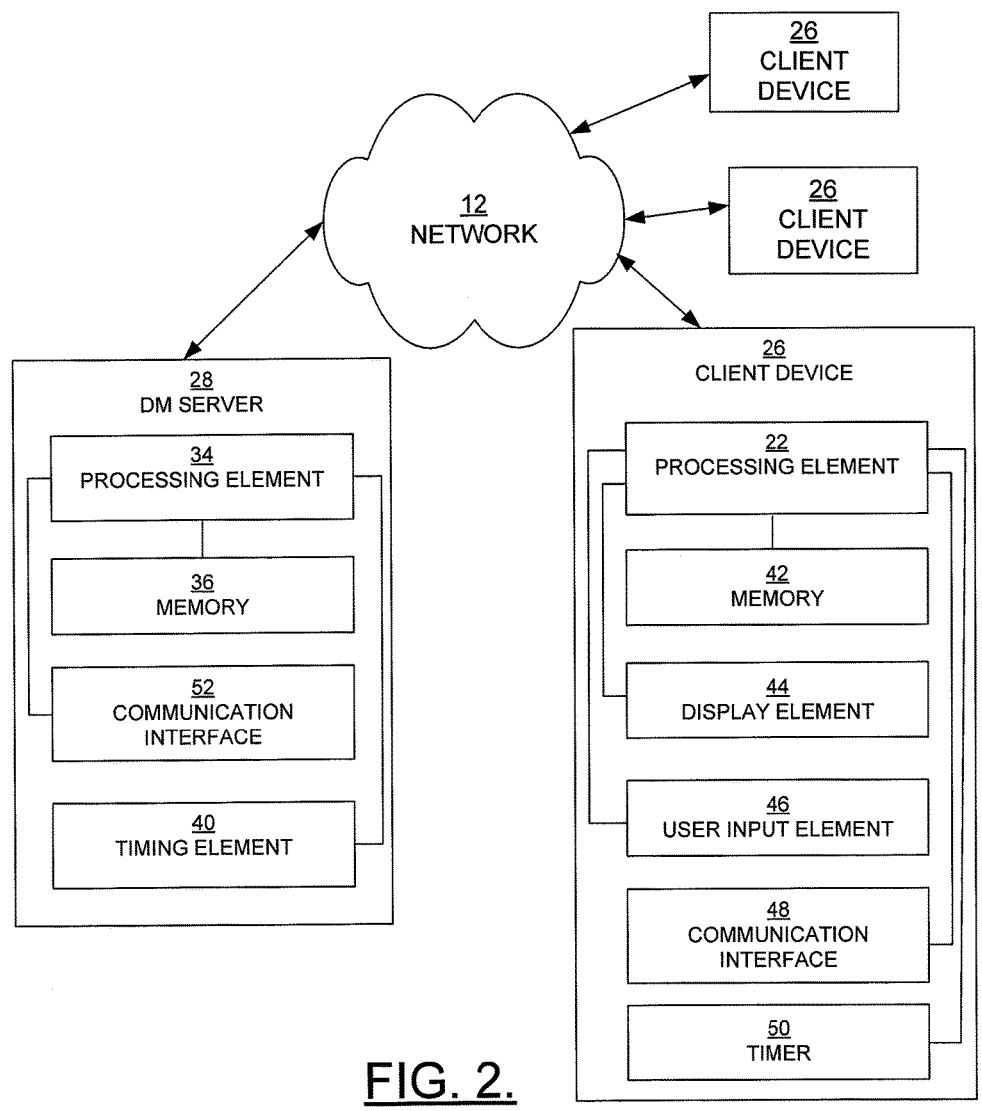
Figure 3:
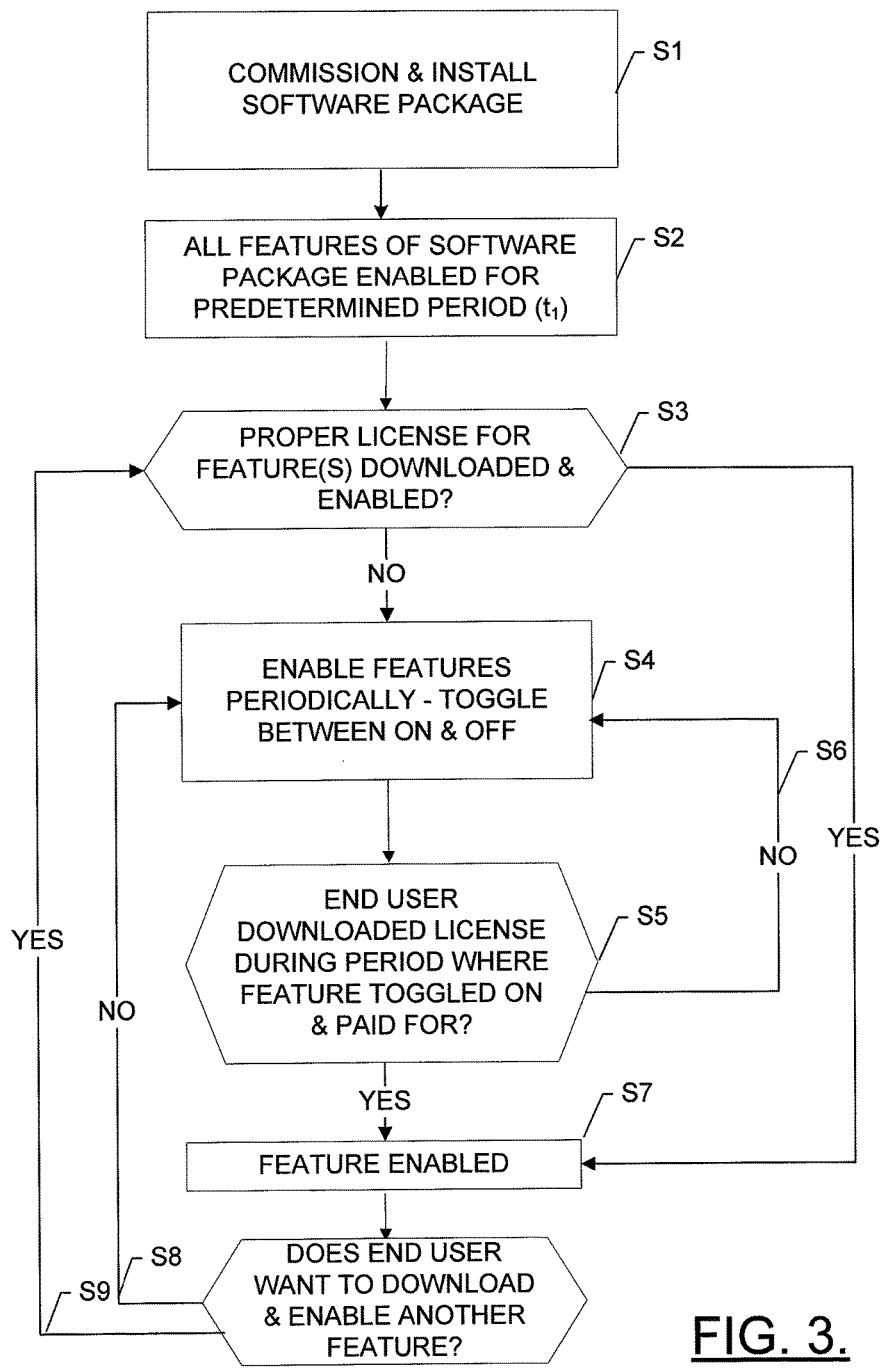
Figure 4:
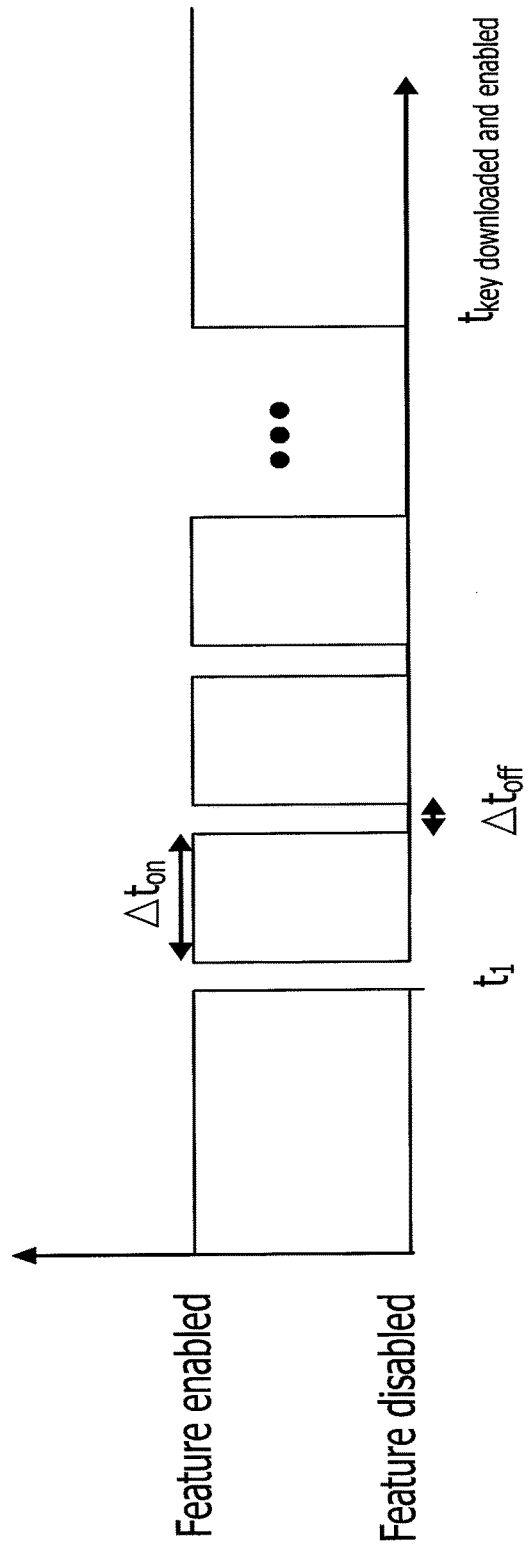

Having thus described the invention in general terms, reference will now be made to the accompanying drawings, which are not necessarily drawn to scale, and wherein:

FIG. 1 is a schematic block diagram of a communications system that may benefit from embodiments of the present invention;

FIG. 2 illustrates a block diagram of a DM server and client devices in accordance with an exemplary embodiment of the present invention;

FIG. 3 is a flowchart of the operation of enabling additional features of a software application for a client device of an operator by downloading a corresponding license from a central license server of the operator; and FIG. 4 is a graphical representation illustrating the time periods for enabling software features corresponding to a software package according to an exemplary embodiment of the present invention.

DETAILED DESCRIPTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, an illustration of one type of system that would benefit from the present invention is provided. The system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

As shown in FIG. 1, and discussed above in the background section, the system 10 includes a public network 12, such as a public Internet Protocol (IP) network (e.g., Internet). In addition to the public network 12, the system 10 includes one or more private networks 24, such as local area networks (LANs), as discussed above. The operator private networks, (e.g., Operator Private Network 1 and Operator Private Network 2) like the public network, can include a number of network elements (e.g., client devices 26 and BTS 32). Additionally, the communications provider private network (e.g., Provider Private Network) can include a DM server 28 which communicates with the client device 26 of the operator private networks. In an alternative embodiment, the private networks may be Asynchronous Transfer Mode (ATM) networks or any other suitable transport network, including but not limited to an Internet Protocol (IP) network, a Plesiochronous Digital Hierarchy (PDH) network, and a Synchronous Digital Hierarchy (SDH) network.

The BTS 32 of system 10 can transmit/receive traffic data to one or more mobile or cellular networks. In this regard, the cellular networks can comprise any of a number of first-generation (1G), second-generation (2G), 2.5G and/or third-generation (3G) cellular networks, and/or any of a number of other cellular networks. For example, the BTS 32 may transmit/receive traffic data to/from a GSM (Global System for Mobile Communication), IS-136 (Time Domain Multiple Access—TDMA), IS-95 (Code Division Multiple Access—CDMA), WCDMA (Wideband Code Division Multiple Access), or EDGE (Enhanced Data GSM Environment) network. In an alternative embodiment of the present invention, the private networks may include a network element such as a Radio Network Controller (RNC) (not shown) capable of transmitting traffic data in a General Packet Radio Service (GPRS) based (e.g., Universal Mobile Telecommunications System—UMTS) network.

Referring now to FIG. 2, a block diagram of network elements such as client devices 26 (client device(s) 26 may be referred to herein as a central database or a central license server or a first device) and DM server 28 are illustrated, in accordance with an exemplary embodiment of the present invention. Client device 26 may be any device capable of functioning as a client device in a device management system, whether the device is a server computer, personal computer, laptop computer, database, or the like. Typically, the client device is a network-side entity that is owned and/or operated by an operator or service provider, as opposed to an end user device. As shown, the client device generally includes a processing element 22 capable of executing a client application such as a software application/package. While the processing element can be configured in various manners, the processing element may be comprised of a microprocessor, controller, dedicated or general purpose electronic circuitry, a suitably programmed computing device, or other means for executing a client application. Processing element 22 may include or be connected to or otherwise be capable of accessing a memory 42. The memory can comprise volatile and/or non-volatile memory or other storage means, and typically stores content, applications, such as software applications/packages, data, or the like.

In addition to the memory 42, the processing element 22 may also be connected to at least one interface or other means for transmitting and/or receiving data or the like. In this regard, the interface(s) can include at least one communication interface 48 or other means for transmitting and/or receiving data. As such, the central license server 26 may be coupled to transmission equipment such as and BTS 32 via communication interface 48. (See, e.g. FIG. 1) The client application(s) i.e., software applications/packages can control data transmission and reception to and from transmission equipment (e.g. BTS 32). For instance, transmission/reception of traffic data to/from the transmission equipment may be restricted based on an array of features that are enabled in the software package which corresponds to a respective software license.

The communication interface 48 may communicate with and receive data (e.g. licenses) from external devices, such as DM server 28, using any known communication technique, whether wired or wireless, including but not limited to serial, universal serial bus (USB), Ethernet, Bluetooth, wireless Ethernet (i.e., WiFi), cellular, infrared, and general packet radio service (GPRS). Upon receipt of data such as a license, the client device may transmit the license to BTS 32 via communication interface 48. The communication interface 48 may enable the client device to communicate with a server such as DM server 28 via a network such as public network 12 (e.g., Internet) or any other suitable communication network.

The processing element may also be connected to at least one user interface that may include a display element 44 and/or a user input element 46. The user input element, in turn, may comprise any of a number of devices allowing the client device to receive data and/or commands from a user, such as a keypad, a touch display, a joystick or other input device. Additionally, the processing element may be connected to a timer 50 which may facilitate execution of client applications within specified time frames.

Device management (DM) server 28 may be any device or means embodied in either hardware, software, or a combination of hardware and software capable of transmitting data, such as a license, or receiving data to/from one or more network elements, such as client devices 26. The DM server 28 may be a server computer, personal computer, laptop computer, database or the like. In an exemplary embodiment, the DM server 28 may be embodied in software as instructions that are stored on a memory of a network device and executed by a processing element. Alternatively, the DM server 28 may include a memory 36 and a processing element 34. The memory 36 can comprise volatile and/or non-volatile memory or other storage means, and typically stores content, applications, data, such as licenses, or the like.

The processing element 34 is capable of executing instructions stored on the memory 36 in which the instructions include code portions for transmitting data such as one or more licenses to a client device 26 when a request for the license is received by the DM server 28 via either a local or remote connection. For instance, the processing element 34 may be connected to at least one interface or other means for transmitting and/or receiving data such as licenses or the like. In this regard, the interface(s) can include at least one communication interface 52 or other means for transmitting and/or receiving data. The communication interface may communicate with and receive data such as requests for licenses from external devices, such as client devices 26 using any known communication technique, whether wired or wireless, including but not limited to serial, universal serial bus (USB), Ethernet, Bluetooth, wireless Ethernet, cellular, infrared and general packet radio service (GPRS). The communication interface 52 may enable the DM server to communicate via a network such as public network 12, or any other suitable communications network. Moreover, the processing element 34 may be connected to a timing element 40 capable of executing the instructions stored on the memory 36 during a specified time frame.

It should be noted that the processing element 34 can be configured in various means. For example, the processing element can be comprised of a microprocessor, controller, coprocessor, or various other processing means or devices including integrated circuits such as, for example, an ASIC (application specific integrated circuit).

Referring now to FIG. 3, a flowchart is provided of the operation of enabling additional features of a software application for a client device of a telecommunications operator by downloading a license via a remote connection with a network element of the telecommunications operator. (While the discussion below is with respect to enabling features of a software application for a client device of a telecommunications operator, it should not be limited in this respect. For instance, exemplary embodiments of the present invention are also capable of enabling additional features of hardware for a client device of a telecommunications operator.) The operator of transmission equipment (e.g., BTS 32) commissions the transmission equipment at a private network, for example, by configuring the transmission equipment and connecting links, cables and the like. The transmission equipment contains a software application and/or package which comprises an array of features provided by the communications provider. These features may include but are not by any means limited to transmission related features such as transport layer features and/or Open Systems Interconnection (OSI) layer 1 to 3 features.

An end user of the operator activates and installs the software package on the transmission equipment. (See operation S1). After installation and activation, all of the features of the software package are partially enabled for a predetermined time period so that the operator may use the features without prohibition. (See operation S2) In other words, installation of the software application invokes a temporary license to use all of the features of the software package or at least those features necessary to permit the acquisition of a more permanent license. As such, the reference to partially enabled relates to a temporal limitation defined by the predetermined time period and not necessarily any limitation upon the features or functionality provided during the predetermined time period. The predetermined time period could be any number of hours, days (e.g., 90 days), weeks, or months. As such, the predetermined time period may serve as a trial period. When the operator desires to fully enable a feature(s) beyond the time corresponding to the predetermined time period, he may do so by paying a fee and downloading a corresponding license from the communications provider (or alternately, receiving a corresponding license via any suitable means such as, for example, receiving the license via ordinary mail on a CD, DVD, or the like) before the predetermined time period expires. The download license request may be transmitted from client device 26 to a server (e.g., DM server 28) of the communications provider. Upon receiving the license requested from the communications provider, at the client device 26, the corresponding license may then be downloaded remotely (or transmitted) from the client license server to the transmission equipment (e.g., BTS 32). (See operation S3) Since all transmission related features are partially enabled during the predetermined time period, the operator does not encounter a remote management deadlock problem in downloading the corresponding license to the transmission equipment. After the proper license is received at the transmission equipment, it is activated so that the feature becomes fully enabled. (See operation S7). If the operator desires to download and fully enable another feature during the predetermined time period, the operator may do so. (See operation S9) As noted above, if by being fully enabled, the features are no longer only available for the predetermined time period, but are, instead, available for a longer period of time, if not an indefinite period of time. Additionally, since the same features may be available during the predetermined time period as following the full enablement of the feature(s), the reference to fully enabled does not necessarily imply the provision of any different or greater functionality from that temporarily provided during the predetermined time period.

On the other hand, if the operator has not downloaded (or otherwise received) a license to fully enable a feature during the predetermined time period, the operator may fully enable the feature at a later stage. For instance, after the expiration of the predetermined time period, the software package features are temporarily enabled on a periodic basis, but are not generally fully operational. For example, unlike the initial predetermined time period described above, the features necessary to permit the acquisition of a proper license may be enabled, but the remainder of the features may remain disabled. More precisely, the software features toggle ON and OFF (i.e., circular) after the expiration of the predetermined time period, thereby allowing the operator to pay for and download (or otherwise receive) a corresponding license at a date beyond the predetermined time period during one of the periods in which the software features are toggled ON. (See operations S4 and S5) The software features may be toggled ON and OFF for any number of hours, days (e.g., toggle ON=1 day, toggle OFF=1 day), weeks, or months. To indicate to the operator that the software features are toggled ON, the communications provider may send a 'Temporary license alarm' to the operator. Similarly, the communications provider may send a 'License missing alarm' to the operator while the software package features are disabled or toggled OFF. The alarm may specify to the operator that download of (or other means of receiving) a corresponding license will be unavailable for a specified time period equal to toggle OFF which may be 24 hours for example. When an end user of the operator downloads (or otherwise receives) a corresponding license from the communications provider while the features are toggled ON and pays the requisite fee for the license, the feature is enabled. (See operation S7). Otherwise, the software package features may continuously toggle ON and OFF circularly. (See operation S6) There is no remote management deadlock situation when the end user of the operator downloads the license while the features are partially operational, i.e., during one of the periods in which the software features are toggled ON, because all of the transmission related features are activated which allows a remote connection from the transmission equipment to client license server 26.

If the user wants to enable another feature while the software package features are toggled ON the user may do so in like manner. (See operation S9). Otherwise, the software package application features may continuously toggle ON and OFF circularly. (See operation S8)

As shown and described herein, a corresponding license may be downloaded from or otherwise transferred from one network element (e.g., DM server 28) to another network element (e.g., client devices 26) (or from client device 26 to BTS 32, for example). It should be understood, however, that the term downloading can be used herein interchangeably, with "uploading," "deploying", "downloading," "providing," "exchanging" and "transferring" a license(s) and can include, for example, moving or copying the license, without departing from the spirit and scope of the present invention.

Referring now to FIG. 4, a graphical representation illustrating the manner of enabling software features corresponding to a software package according to an exemplary embodiment of the present invention is provided. As shown, feature(s) of the software package are enabled temporarily for a predetermined time period $t_1$. In an exemplary embodiment, the predetermined time period $t_1$ may be 90 days. After the predetermined time period $t_1$ has elapsed the features are toggled ON $\Delta t_{on}$ and OFF $\Delta t_{off}$ circularly. In other words, the features are enabled and disabled as long as a proper license has not been downloaded (or otherwise received) and enabled by the operator. While the enablement and disablement may be performed on a periodic basis, the features may be alternately enabled and disabled in a non-periodic manner, and/or in a manner that changes over time, if so desired. In this manner, the remote management deadlock problem can be prevented while the feature is partially operationally, as discussed above and features of the software package can be purchased separately even after the expiration of a static time period such as a trial period. In an exemplary embodiment $\Delta t_{on} = \Delta t_{off} = 1$ day. However, it should be understood that $\Delta t_{on}$ and $\Delta t_{off}$ may be any number of hours, days, weeks, or months without departing from the scope of the present invention. Similarly, $\Delta t_{on}$ and $\Delta t_{off}$ need not have the same time period. A software feature(s) becomes fully operational as soon as a corresponding license has been downloaded and activated by the operator during the time period designated $t_{key\ downloaded\ and\ enabled}$.

The method of operation for enabling additional features of a software application for a network element such as transmission equipment (e.g., BTS 32), as set forth in FIG. 3, may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device, such as memory 42, and executed by an associated processing unit, such as processing element 22.

In this regard, FIG. 3 is a flowchart of methods and program products according to embodiments of the invention. It will be understood that each step of the flowchart, and combinations of the steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
temporarily enabling, at a first device, one or more transmission software features, configured to control transmission and reception of data at a first network element comprising a base transceiver station, for a predetermined time period;
alternately disabling and enabling the one or more transmission software features periodically, via the first device, after the predetermined time period expires during respective disabling and enabling time periods;
obtaining, via the first device, one or more licenses from a second network element, corresponding to the one or more features, during the predetermined time period or during a subsequent enabling time period; and
activating the one or more licenses obtained during the predetermined time period or during the subsequent enabling time period and enabling provision, via the first device, of the one or more licenses to the first network element to fully enable the one or more transmission software features, configured to control the transmission of data from the first network element and the reception of data at the first network element.

2. The method of claim 1, wherein, during the disabling time period, the one or more transmission software features are not enabled.

3. The method of claim 1, further comprising:
enabling provision of payment for the one or more licenses, and wherein, the activating occurs after providing payment for the one or more licenses.

4. The method of claim 1, further comprising:
causing receipt, at the first device, of a first notice during the enabling time period specifying that the one or more licenses are accessible and a second notice during the disabling time period specifying that the one or more licenses are not accessible.

5. The method of claim 1, wherein obtaining the one or more licenses comprises receiving the one or more licenses from the second network element in response to sending a request for the one or more licenses to the second network element.

6. The method of claim 1, wherein:
obtaining the one or more licenses comprises obtaining a first license, at the first device, corresponding to a respective one of the one or more transmission software features, during the predetermined time period or during the subsequent enabling time period;
activating further comprises activating the first license to fully enable the respective one of the one or more transmission software features; and wherein the method further comprises:
alternately disabling and enabling remaining ones of the one or more transmission software features after the predetermined time period expires during the respective disabling and enabling time periods;
obtaining respective ones of the remaining licenses, at the first device, corresponding to respective ones of the one or more transmission software features, during the predetermined time period or during the subsequent enabling time period; and
activating, via the first device, the respective ones of the remaining licenses and enabling provision of the remaining licenses to the network device to fully enable the respective ones of the one or more transmission software features.

7. An apparatus comprising:
at least one processor; and
at least one memory including computer program code, the at least one memory and the computer program code configured to, with the at least one processor, cause the apparatus to perform at least the following:
temporarily enable one or more transmission software features, configured to control transmission and reception of data at a first network element comprising a base transceiver station, for a predetermined time period;
alternately disable and enable the one or more transmission software features periodically after the predetermined time period expires during respective disabling and enabling time periods;
obtain, from a second network element, one or more licenses corresponding to the one or more transmission software features, during the predetermined time period or during a subsequent enabling time period; and
activate the one or more licenses obtained during the predetermined time period or during the subsequent enabling time period and enable provision of the one or more licenses to the first network element to fully enable the one or more transmission software features, configured to control the transmission of data from the first network element and the reception of data at the first network element.

8. The apparatus according to claim 7, wherein, during the disable time period the at least one memory and the computer program code are further configured to, with the at least one processor, cause the apparatus to:
determine that the one or more transmission software features are not enabled.

9. The apparatus according to claim 7, wherein the at least one memory and the computer program code are further configured to, with the at least one processor, cause the apparatus to:
facilitate payment for the one or more licenses; and
activate the one or more licenses after payment for the one or more licenses.

10. The apparatus according to claim 7, wherein the at least one memory and the computer program code are further configured to, with the at least one processor, cause the apparatus to:
cause receipt of a first notice during the enable time period specifying that the one or more licenses are accessible and a second notice during the disable time period specifying that the one or more licenses are not accessible.

11. The apparatus according to claim 7, wherein the at least one memory and the computer program code are further configured to, with the at least one processor, cause the apparatus to:
obtain the one or more licenses by causing receipt of the one or more licenses from the second network element in response to enabling provision of a request for the one or more licenses to the second network element.

12. The apparatus according to claim 7, wherein:
obtain comprises obtaining a first license corresponding to a respective one of the one or more transmission software features, during the predetermined time period or during the subsequent enabling time period;
activate comprises activating the first license to fully enable the respective one of the one or more transmission software features; and wherein the at least one memory and the computer program code are further configured to, with the at least one processor, cause the apparatus to:

alternately disable and enable remaining ones of the one or more transmission software features after the predetermined time period expires during the respective disabling and enabling time periods;
obtain respective ones of the remaining licenses corresponding to respective ones of the one or more transmission software features, during the predetermined time period or during the subsequent enabling time period; and
activate the respective ones of the remaining licenses and enable provision of the remaining licenses to the network device to fully enable the respective ones of the one or more transmission software features.

13. A computer program product comprising at least one non-transitory computer-readable storage medium having computer-readable program code-portions stored therein, the computer-readable program code portions comprising:
a first executable portion configured to temporarily enable, at a first device, one or more transmission software features, configured to control transmission and reception of data at a first network element comprising a base transceiver station, for a predetermined time period;
a second executable portion configured to alternately disable and enable the one or more transmission software features periodically after the predetermined time period expires during respective disabling and enabling time periods;
a third executable portion configured to obtain one or more licenses, via the first device from a second network element, corresponding to the one or more transmission software features, during the predetermined time period, or during a subsequent enabling time period; and
a fourth executable portion configured to activate the one or more licenses obtained during the predetermined time period or during the subsequent enabling time period and enable provision, via the first device, of the one or more licenses to the first network element to fully enable the one or more transmission software features, configured to control the transmission of data from the first network element and the reception of data at the first network element.

14. The computer program product of claim 13, wherein the second executable portion comprises instructions specifying that during the disabling time period the one or more transmission software features are not enabled.

15. The computer program product of claim 13, further comprising:
a fifth executable portion configured to facilitate payment for the one or more licenses, and wherein activate, via the first device, occurs after payment for the one or more licenses.

16. The computer program product of claim 13, further comprising:
a sixth executable portion configured to cause receipt, at the first device of a first notice during the enabling time period specifying that the one or more licenses are accessible and a second notice during the disabling time period specifying that the one or more licenses are not accessible.

17. The computer program product of claim 13, wherein obtain the one or more licenses comprises causing receipt of the one or more licenses from the second network element in response enabling provision of a request for the one or more licenses to the second network element.

18. The computer program product of claim 16, wherein:
obtain the one or more licenses further comprises obtaining a first license, via the first device, corresponding to a respective one of the one or more transmission software features, during the predetermined time period or during the subsequent enabling time period;
activate further comprises activating the first license to fully enable the respective one of the one or more transmission software features; and wherein the computer program product further comprises:
a seventh executable portion configured to alternately disable and enable remaining ones of the one or more transmission software features after the predetermined time period expires during the respective disabling and enabling time periods;
an eighth executable portion configured to obtain respective ones of the remaining licenses, via the first device, corresponding to respective ones of the one or more transmission software features, during the predetermined time period or during the subsequent enabling time period; and
a ninth executable portion configured to activate, the respective ones of the remaining licenses and enable provision of the remaining licenses to the network device to fully enable the respective ones of the one or more transmission software features.

19. The method of claim 1, wherein a time interval of the disabling time period is the same as a time interval of the enabling time period.

20. The method of claim 1, wherein a time interval of the disabling time period is different from a time interval of the enabling time period.

21. The apparatus of claim 7, wherein a time interval of the disabling time period is the same as a time interval of the enabling time period.

22. The apparatus of claim 7, wherein a time interval of the disabling time period is different from a time interval of the enabling time period.

23. The computer program product of claim 13, wherein a time interval of the disabling time period is the same as a time interval of the enabling time period.

24. The computer program product of claim 13, wherein a time interval of the disabling time period is different from a time interval of the enabling time period.

25. The method of claim 1, wherein:
the transmission software features comprise Open Systems Interconnection layer features or transport layer features.

26. The apparatus of claim 7, wherein:
the transmission software features comprise Open Systems Interconnection layer features or transport layer features.

27. The computer program product of claim 13, wherein:
the transmission software features comprise Open Systems Interconnection layer features or transport layer features.

28. The method of claim 1, wherein:
the transmission software features activate packet-switched network transmissions of the first network element.

29. The apparatus of claim 7, wherein:
the transmission software features activate packet-switched network transmissions of the first network element.

30. The computer program product of claim 13, wherein:
the transmission software features activate packet-switched network transmissions of the first network element.

* * * * *